United States Patent
Ramage et al.

[11] 3,897,716
[45] Aug. 5, 1975

[54] FLOW CONTROL MEANS FOR A SERVOMOTOR

[75] Inventors: Jerrie K. Ramage; Delbert J. Gardner, both of South Bend, Ind.

[73] Assignee: The Bendix Corporation, South Bend, Ind.

[22] Filed: Aug. 20, 1973

[21] Appl. No.: 389,751

[52] U.S. Cl. .................. 91/29; 91/376; 92/78; 55/313
[51] Int. Cl. .............................. F15b 9/10
[58] Field of Search...... 91/29, 28, 6, 369 A, 369 B, 91/369 R; 92/78; 55/309, 313, 385, 495

[56] References Cited
UNITED STATES PATENTS

| | | |
|---|---|---|
| 2,823,760 | 2/1958 | Anderson.......................... 55/313 |
| 3,224,171 | 12/1965 | Bowman.......................... 55/313 |
| 3,289,547 | 12/1966 | Kytta.......................... 91/369 A |

*Primary Examiner*—Paul E. Maslousky
*Attorney, Agent, or Firm*—Leo H. McCormick, Jr.; William N. Antonis

[57] ABSTRACT

A filtering apparatus for use in a pressure differential operated servomotor to provide a primary flow path during a first rate of input force application and a secondary flow path during a second rate of input force application to effectively establish the pressure differential as a direct function of the rate of application of the input force.

6 Claims, 4 Drawing Figures

PATENTED AUG 5 1975
3,897,716
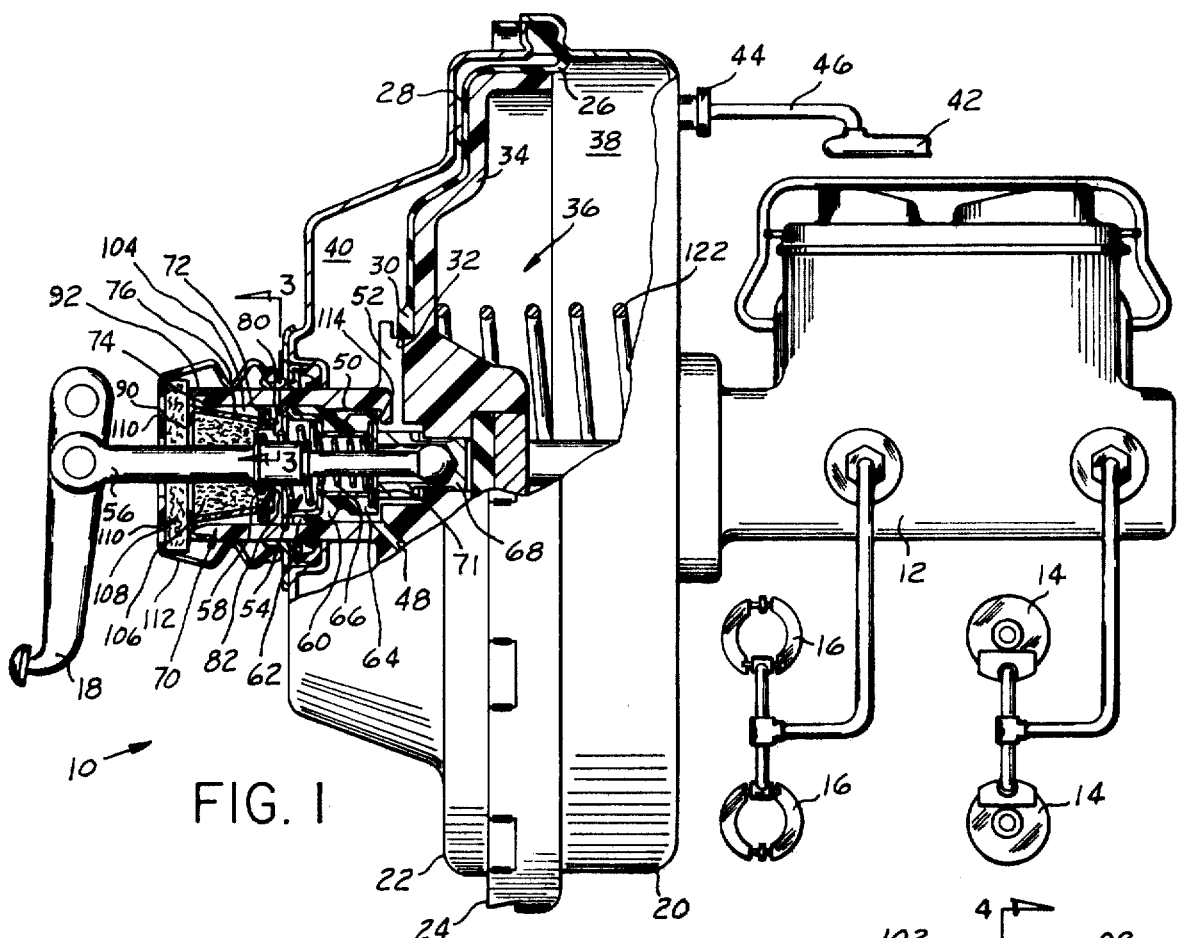
FIG. 1
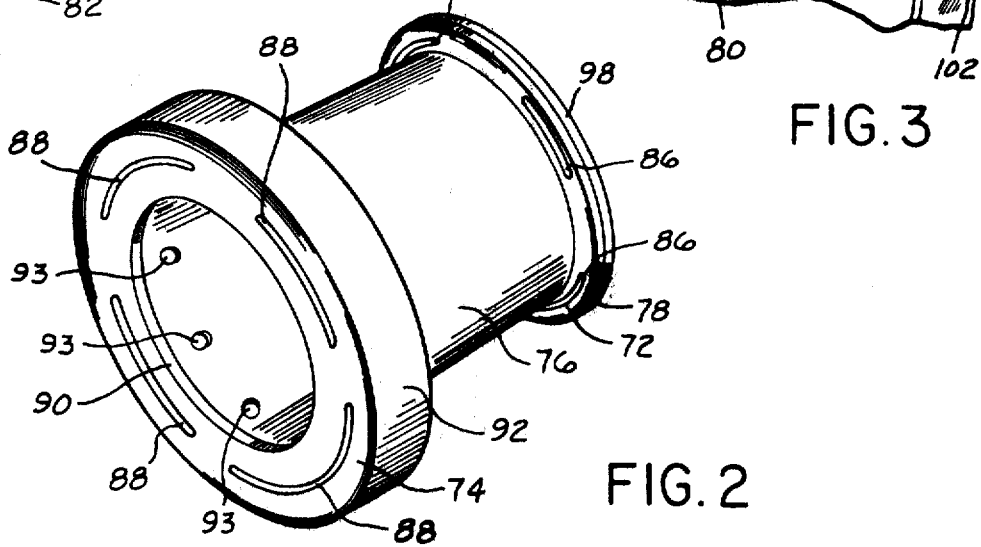
FIG. 4
FIG. 3
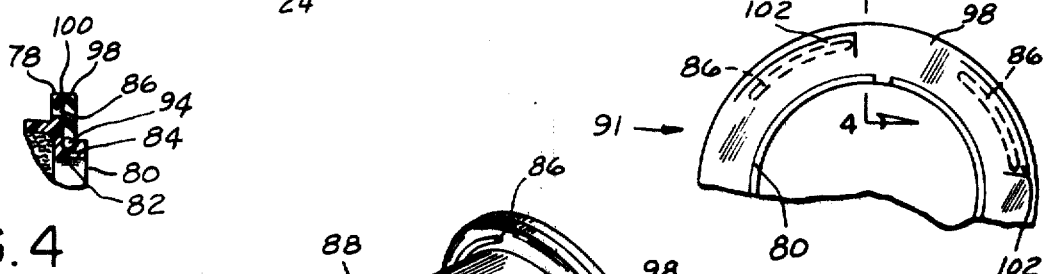
FIG. 2

FLOW CONTROL MEANS FOR A SERVOMOTOR

BACKGROUND OF THE INVENTION

Initially pneumatic servomotors such as disclosed in U.S. Pat. No. 3,106,873 were constructed in a manner such that air from the environment directly entered the rear chamber thereof to create the operational pressure needed to operate the master cylinder during a braking application. However, after a period of time during which the brakes were repeatedly applied, because of the contaminants carried by the air, the control valves became inoperative. Consequently, an in-line filter was placed in the air supply conduit to prevent contaminants from being communicated to the valve means. As a result, valve stability was enhanced and the noise caused by the air entering the vacuum chamber attenuated. Unfortunately, use of such an in-line filter arrangement results in an increase in the time interval required to create the desired maximum pressure differential. However, the time interval for creation of the maximum pressure differential was completely adequate until the introduction of emission control devices in which the available vacuum produced at the intake manifold of most vehicles was reduced thereby correspondingly reducing the maximum potential pressure differential. As a result, during brake standardization tests established by the Department of Transportation some vehicles could not stop within the set braking distances.

SUMMARY OF THE INVENTION

Keeping in mind that a fast brake application, wherein maximum pressure build-up is needed, will only occur during a panic stop, we have provided a servomotor with a flow control system wherein during a brake application environmental air will proportionally by-pass the filtering means in the servomotor as a function of the rate of application of an input actuation force.

The flow control means includes a disc means separated from a cap means by a cylindrical spacer means. The disc means surrounds the input rod of the control valve means and is located within the hub means adjacent the control valve means. The cap means has a lip which surrounds the external periphery of the hub means to maintain the cylindrical spacer means concentrically within the hub means. The cap means and the disc means each have a series of peripheral openings in addition to an axial bore through which air from the environment may pass. However, adjacent the peripheral openings in the disc means, a corresponding series of resilient flappers impede the air flow into the valve control means. A filter extends along the interior of the cylindrical spacer to remove contaminants from the environmental air without adversely affecting the free flow of the environmantal air into the control valve means through the axial bore. Upon an input force being applied to the control valve means, the air from the environment will pass through the filter into the valve control area of the hub means and flow into the vacuum evacuated space on one side of the wall means across which the operational pressure differential will be created. If the flow of the air passing the control valve means in response to the rate of application exceeds a predetermined value, a corresponding actuation pressure differential will be created across the flapper means to allow air from the environment to flow directly through the cap means and into the control valve means by by-passing the filter upon opening of the flapper means. Upon termination of the actuation pressure differential, the flapper means will again seat over the peripheral openings in the disc means and the operational air again routed through the filter to meet the air supply required by the control valve means.

It is therefore an object of this invention to provide a servomotor with flow control means for delivering an operational fluid commensurate with an input force.

It is still another object of this invention to provide a control valve means with operational fluid supplied as a function of the rate of application of an input force.

It is still a further object of this invention to provide a flow control means having a by-pass means around a filter which by-pass means becomes operational upon a rate of application exceeding a predetermined value.

These and other objects of this invention will become apparent from reading the specification and viewing the drawings.

BRIEF DESCRIPTION OF THE DRAWINGS

FIG. 1 is a schematic view of a power brake system having a servomotor with a flow control means for proportionally supplying an operational fluid to a control valve means as a function of the rate of application of the servomotor by an operator.

FIG. 2 is a perspective view of the flow control means of FIG. 1.

FIG. 3 is a sectional view taken along line 3—3 of FIG. 1.

FIG. 4 is a sectional view taken along line 4—4 of FIG. 3.

DETAILED DESCRIPTION OF THE PREFERRED EMBODIMENT

In the braking system shown in FIG. 1, a servomotor means 10 is connected to a master cylinder 12 which supplies the front wheel brakes 14 and the rear wheel brakes 16 with a hydraulic fluid under pressure in response to an actuation input force being applied to the foot pedal 18 by an operator.

The servomotor means 10 has a front shell 20 joined to a rear shell 22 by a twist lock means 24. The twist lock means 24 holds an external peripheral bead 26 of the diaphragm 28 while an internal peripheral bead 30 snaps into a groove 32 adjacent the wall 34 radiating from the hub means 36. The wall 34 and the diaphragm 28 separate the area between the front shell 20 and the rear shell 22 into a front chamber 38 and a rear chamber 40. The front chamber 38 is connected to a source of vacuum, such as an intake manifold 42, through check valve 44 in conduit 46. The front chamber 38 is connected to the rear chamber 40 through the interconnection of a first passage 48 which extends into an axial bore 50 in the hub means and a second passage 52 which extends from the axial bore 50 to the rear chamber 40.

A control valve means 54 located in the axial bore is positioned by a return spring 58 acting on push rod 56 to regulate the communication of vacuum from the first passage into the axial bore 50. The control valve means 54 includes a poppet member 60 which has one end 62 secured to the hub means 36 and the other end 64 centrally located in the axial bore 50 by coil spring 66. In the released position, as shown in FIG. 1, the return spring 58 acts on the plunger 68 to move the atmospheric seat 71 thereon against the end 64 in opposition to the coil spring 66 to prevent the air in the environment from entering the second passage 52 through bore 50.

The air is presented to the control valve means 54 through a flow control means 70 as a function of the rate of application of the input force applied to pedal 18 by the operator.

The flow control means 70 consists of a disc 72 separated from a cap 74 by a cylindrical spacer 76. The disc 72 has an external periphery 78 which substantially fills the bore 50 and a projection 80 which extends axially from the inner periphery 82, see FIG. 4. The disc 72 has a series of arcuate slots 86 located between the cylindrical spacer 76 and the external periphery 78 to provide a by-pass or secondary flow path for air from the environment. A flapper means 91 has a bead 94 which is located in a groove 96 in the projection 80. The groove 96 is adjacent the disc 72 to position the resilient plate 98 against the end surface 100. The resilient plate 98 has a series of tabs 102 which overlie the arcuate slots 86 to regulate the air flow therethrough.

The cap 74 has a lip 92 which surrounds the external periphery of the hub means 36 to maintain the cylindrical spacer 76 in a predetermined position with respect to the bore 50. The cap 74 has a series of arcuate slots 88 located between the connecting junction of the cylindrical spacer 76 and the bore 50. The arcuate slots 88 will allow air from the environment to enter into the by-pass chamber 104. The cylindrical spacer 76 has a series of radial holes 93 adjacent the cap 74 to provide a flow path for air into the first filter 106 which is positioned between the disc 72 and cap 74. A second filter 108 abuts the cap 74 to precondition the air from the environment as it passes through holes 110 in dust boot 112.

MODE OF OPERATION OF THE PREFERRED EMBODIMENT

When an operator desires to stop the vehicle, an input force is applied to the brake pedal 18. This input force will move the push rod 56 which will sequentially move the plunger 68 and allow spring 66 to seat the end 64 of the poppet 60 on the vacuum seat 114. This will interrupt vacuum communication between passage 48 and the bore 50. Further movement of the plunger 68 will move the atmospheric seat 71 away from the end 64 of the poppet 60 to allow air to enter the rear chamber 40 after flowing along a primary flow path through the filters 106 and 108. Air enters this primary flow path by simultaneously flowing through the axial opening between the inner periphery 90 of the cap 74 and through the radial holes 93 by way of the arcuate slots 88.

During a rapid brake application, the plunger 68 will be wide open and air will rush into the rear chamber 40 through the second passage 52 to create the operational pressure differential across the wall means 28 and 34. As this air rapidly enters the area around the control valve means 54, a pressure differential will be created across tabs 102 of the flapper means 91. This pressure differential will cause tabs 102 to be lifted off the arcuate slots 86 and allows air to enter into the bore 50 of the hub means 36 through an auxiliary secondary flow path by passing through slots 88 and from the opening between the push rod 56 and inner periphery of 90 out radial holes 93 to slots 86 without passing through the remainder of filter 106. When the rear chamber 40 becomes filled with air, the flow demand through the control valve means 54 for establishing the pressure differential in response to the input force associated with the rapid brake application will cease and the pressure differential across the tabs 102 will be terminated. The resiliency of the plate 98 will again seat the tabs 102 over the arcuate slots 86 to redirect any additional air from the environment through the filter 106. Upon termination of the input force on the pedal 18, the return spring 58 will move the plunger 68 into contact with poppet end 64 and thereby move the end 64 away from seat 71 to permit the vacuum available in the front chamber 38 to evacuate the air from the rear chamber 40 and allow spring 122 to move the hub means 36 toward the rear shell to release the pressurizing force on the piston (not shown) in the master cylinder.

To evaluate the braking system 10, we ran various tests to determine the feasibility of equipping servomotors with flow control means 70. The following table indicates the results from a simulated panic stop condition:

| Dust Boot (112) | Servomotor Flow Control Means (70) | Filter ± | Output Pressure | Time Sec. |
|---|---|---|---|---|
| None | None | None | 950 lb./in.$^{-2}$ | 0.23 |
| Yes | None | Yes | 950 lb./in.$^{-2}$ | 0.35 |
| Yes | Yes | Yes | 950 lb./in.$^{-2}$ | 0.28 |

In meeting the safety standards set forth by the D.O.T. safety standards it is required to bring a vehicle to a panic stop from 60 mph. Any increase in the time interval required to create the necessary braking pressure differential will directly affect the stopping distance of the vehicle. At 60 mph. a 0.1 second reduction in the establishment of the required pressure differential could reduce the stopping distance by 6.6 feet, a distance sufficient to oftentimes avoid a collision.

We claim:

1. In a servomotor having wall means movable in response to a first fluid flowing through a passageway in a hub means upon movement of a control valve means to establish a pressure differential with a second fluid in response to an input force from an operator, flow control means for providing a flow path commensurate with said input force, said flow control means comprising:

disc means located in said passageway adjacent said control valve means having an axial bore therein and a first series of arcuate slots located adjacent the external periphery thereof, said disc means having an area substantially equal to said passageway;

cylindrical means fixed to and extending rearwardly from said disc means;

cap means fixed to said cylindrical means and surrounding a portion of said hub means for maintaining the cylindrical means in a predetermined position with respect to the hub means, said cap means having an axial bore therein for establishing a first flow path for the first fluid and a second series of arcuate slots located between the cylindrical means and the internal periphery of the passageway in the hub means;

first filter means located between said disc means and said cap means for substantially filling said axial bore therebetween, said first fluid freely flowing primarily in the first flow path through said first filter during the application of said input force; and bypass means secured to said disc means for repeatably establishing an auxiliary secondary flow path for said first fluid through the first series of arcuate slots and the second series of arcuate slots to help meet a flow demand for establishing said pressure differential upon the rate of said input force exceeding a predetermined value.

2. In the servomotor, as recited in claim 1, wherein said cylindrical means includes:

a series of radial holes located therein adjacent said cap means for establishing a passage through which the first fluid can flow from the second series of arcuate slots into the first filter means during the application of an input force.

3. In the servomotor, as recited in claim 2, wherein said bypass means includes:

flapper means attached to said disc means for controlling the flow of the first fluid through the secondary flow path.

4. In the servomotor, as recited in claim 3, wherein said disc means includes:

a first projection extending toward said valve means having a first annular groove perpendicularly abutting a vertical wall below the inner periphery of the first series of arcuate slots for retaining said flapper means.

5. In the servomotor, as recited in claim 4, wherein said flapper means includes:

a first bead resiliently located in the first annular groove for holding the interior periphery of the flapper means in contact with the disc means.

6. In the servomotor, as recited in claim 5, wherein said flow control means further includes:

second filter means adjacent said cap means for preconditioning said first fluid before the first fluid enters the first and second flow paths.

* * * * *